United States Patent [19]

Kaiser

[11] 3,922,706

[45] Nov. 25, 1975

[54] TRANSISTOR HAVING EMITTER WITH HIGH CIRCUMFERENCE-SURFACE AREA RATIO

[75] Inventor: Reinhold Kaiser, Heilbronn, Germany

[73] Assignee: Telefunken Patentverwertungsgesellschaft m.b.H., Ulm, Danube, Germany

[22] Filed: Nov. 3, 1969

[21] Appl. No.: 871,760

Related U.S. Application Data

[63] Continuation of Ser. No. 569,445, Aug. 1, 1966, abandoned.

[30] Foreign Application Priority Data

July 31, 1965 Germany ............................... 29116

[52] U.S. Cl. ........................ 357/36; 357/45; 357/68

[51] Int. Cl.² .................... H01L 27/10; H01L 29/72

[58] Field of Search ........................... 357/36, 45, 46

[56] References Cited

UNITED STATES PATENTS

| | | | |
|---|---|---|---|
| 2,705,767 | 4/1955 | Hall | 317/235 |
| 2,858,489 | 10/1958 | Henkels | 317/235 |
| 2,875,505 | 3/1959 | Peann | 317/235 |
| 2,897,421 | 7/1959 | Kruper | 317/235 |
| 2,924,760 | 2/1960 | Herlet | 317/235 |
| 3,044,147 | 7/1962 | Armstrong | 317/235 |
| 3,166,448 | 1/1965 | Hubner | 317/235 |
| 3,230,398 | 1/1966 | Evans et al. | 317/235 |
| 3,252,063 | 5/1966 | Ziffer | 317/235 |
| 3,280,391 | 10/1966 | Bittmann et al. | 317/235 |
| 3,316,128 | 4/1967 | Osafune et al. | 317/235 |
| 3,319,139 | 5/1967 | Rueffer | 317/235 |
| 3,333,166 | 7/1967 | Hochman | 317/235 |
| 3,352,726 | 11/1967 | Luce | 317/235 |
| 3,358,197 | 12/1967 | Scarlett | 317/235 |
| 3,363,154 | 1/1968 | Haas | 317/235 |
| 3,383,568 | 5/1968 | Cunningham | 317/235 |

FOREIGN PATENTS OR APPLICATIONS

| | | | |
|---|---|---|---|
| 954,534 | 4/1964 | United Kingdom | 317/235 |

*Primary Examiner*—Martin H. Edlow
*Attorney, Agent, or Firm*—Spencer & Kaye

[57] ABSTRACT

A transistor comprising a unitary emitter having a plurality of perforations therein and a unitary base, portions of which extend through openings in the emitter, to thereby form a transistor having an emitter with a high ratio between its circumference and surface area.

10 Claims, 5 Drawing Figures

INVENTOR
Reinhold Kaiser

BY Spencer & Kaye
ATTORNEYS

INVENTOR
Reinhold Kaiser

BY Spencer & Kaye
ATTORNEYS

INVENTOR
Reinhold Kaiser
BY Spencer & Kaye
ATTORNEYS

INVENTOR
Reinhold Kaiser
BY Spencer & Kaye
ATTORNEYS

TRANSISTOR HAVING EMITTER WITH HIGH CIRCUMFERENCE-SURFACE AREA RATIO

CROSS REFERENCE TO RELATED APPLICATION

The present application is a continuation of patent application Ser. No. 569,445, filed Aug. 1, 1966, now abandoned.

The present invention relates to a new and improved transistor and to a method for making such transistor. More particularly, the present invention relates to a transistor adapted for high emitter current densities and for high frequencies and to a method for making the transistor.

In order to produce a transistor useful for circuits requiring a high current density and for high frequency purposes, it is generally known that the ratio of the circumference of the emitter zone to the surface of the emitter zone must be made as large as possible if a large emitting surface is to be provided.

Accordingly, it is an object of the present invention to provide a new and improved transistor and a method for making the transistor.

Another object of the present invention is to provide a new and improved transistor having a high ratio between the circumference of the emitter and the surface of the emitter.

A further object of the present invention is to provide a new and improved transistor having a perforated emitter region.

With the above objects in mind, the present invention mainly comprises a transistor having a base, a collector, and an emitter region. The emitter region is perforated and portions of the base region extend into the perforations of the emitter.

In a preferred embodiment incorporating the principles of the present invention, the portions of the base region which extend into the emitter region perforations extend as far as the surface of the transistor.

The invention may be practiced by a method for producing a transistor wherein the perforated emitter zone is fabricated by means of a grid-shaped diffusion mask.

Additional objects and advantages of the present invention will become apparent upon consideration of the following description when taken in conjunction with the accompanying drawings in which.

Figure 1:
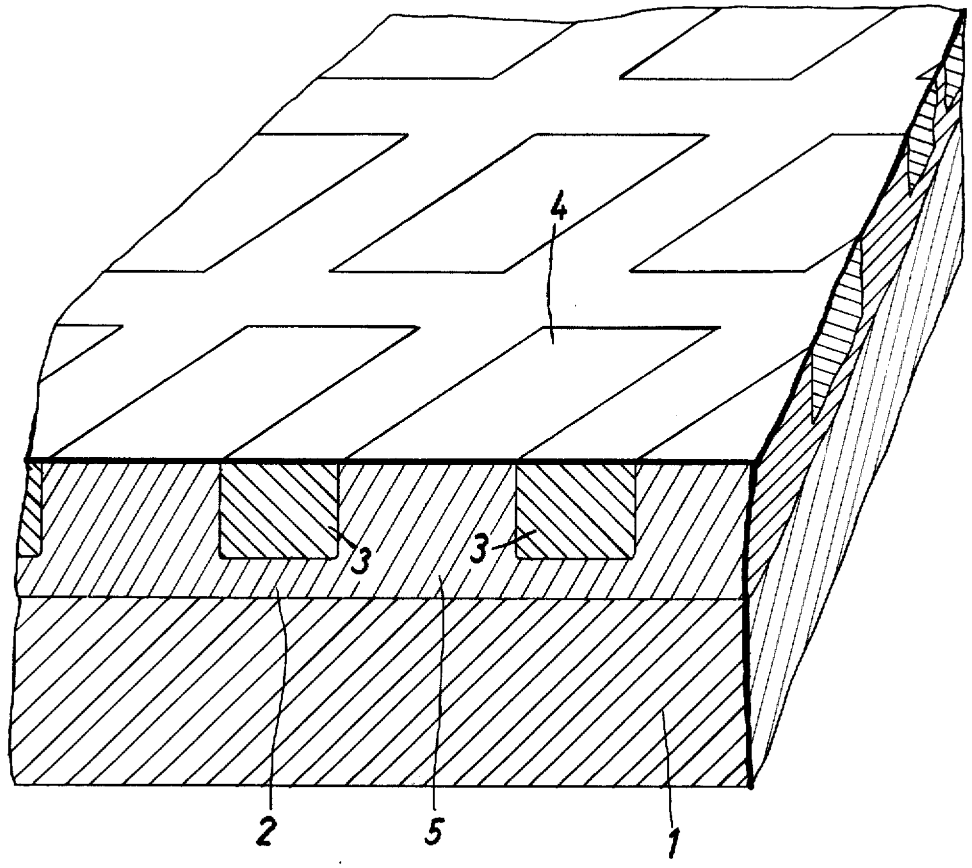
FIG. 1 is a perspective view showing schematically a transistor constructed in accordance with the principles of the present invention.

Referring now to the drawings and, more particularly, to FIG. 1, a planar transistor arrangement is shown having a collector region 1, a base region 2, and an emitter region 3. It can be seen that the emitter region 3 has a series of perforations which give the emitter region a sieve-like structure and that the perforations have been filled in by portions 5 of the base region 2. It can further be seen that the portions 5 of the base region 2 extend to the semiconductor slab surface of the transistor of FIG. 1. In order not to unnecessarily complicate the drawing, the oxide layer which is normally arranged on the surface of the transistor has not been illustrated.

Figure 2:
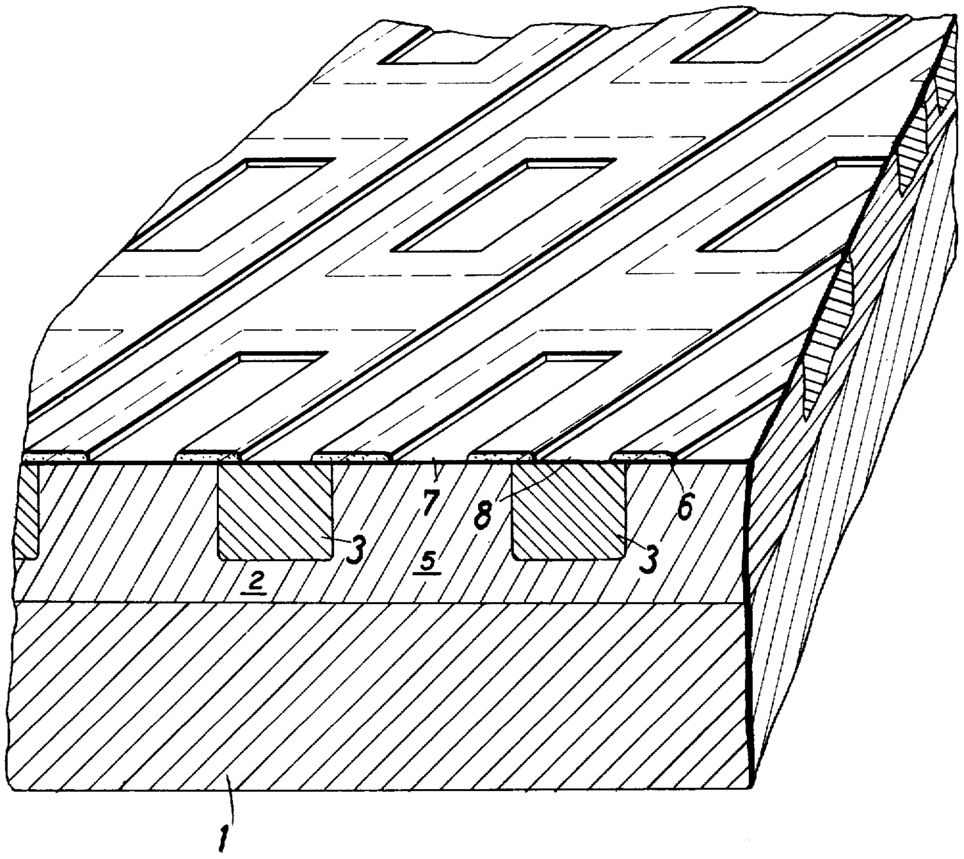
FIG. 2 is a perspective view of the transistor of FIG. 1 showing an oxide layer thereon.

Referring now to FIG. 2, the oxide layer portion 6 is shown arranged on the surface of the transistor of FIG. 1. The oxide layer 6 is provided with openings 7 and 8. The openings 7 are arranged above the portions 5 of the base region 2 which extend into the perforations of the emitter. The openings 8 communicate with the emitter region 3.

Figure 3:
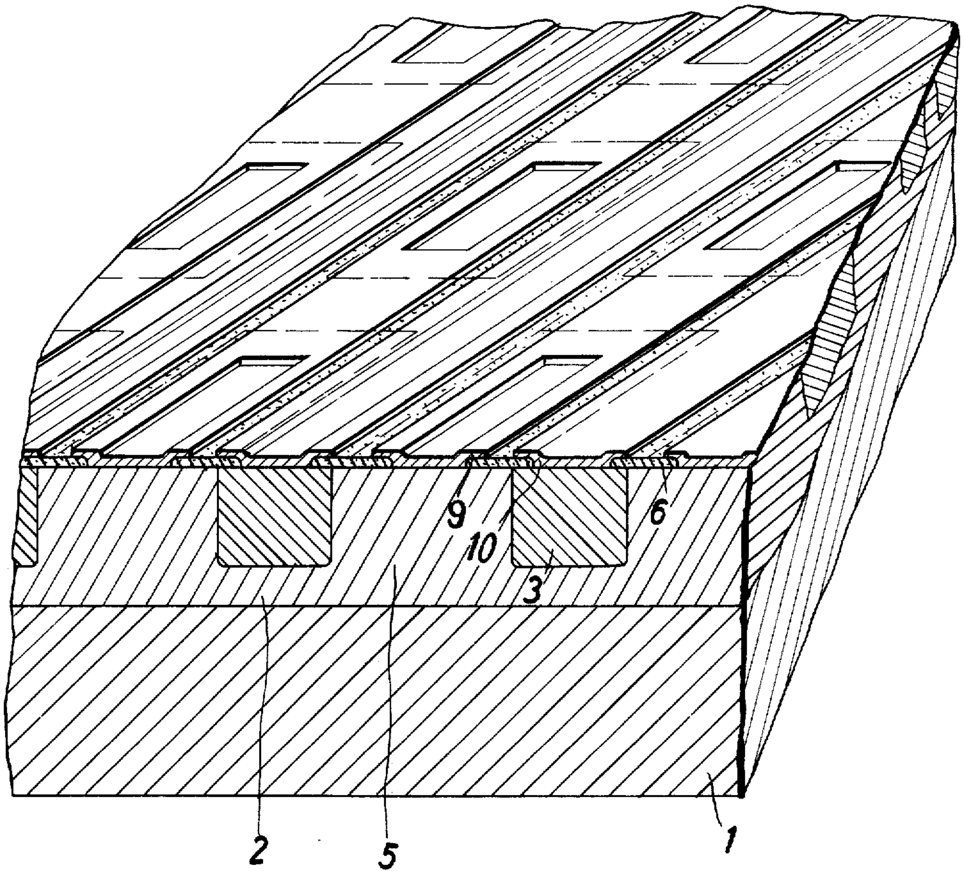
FIG. 3 is a perspective view of the transistor of FIG. 2 showing electrical connection means to the emitter and base regions.

Referring now to FIG. 3, it can be seen that electrical connecting means have been arranged over the transistor arrangement of FIG. 2. That is, electrically conductive material such as aluminum has been deposited over the openings 8 in the oxide layer 6 to form the conductor 10. Similarly, the conductor 9 is formed over the openings corresponding with the base portions 5. Thus, it can be seen that the conductor 10 makes electrical contact with the emitter region 3 while the conductor 9 makes electrical contact with the base region 5.

Figure 4:
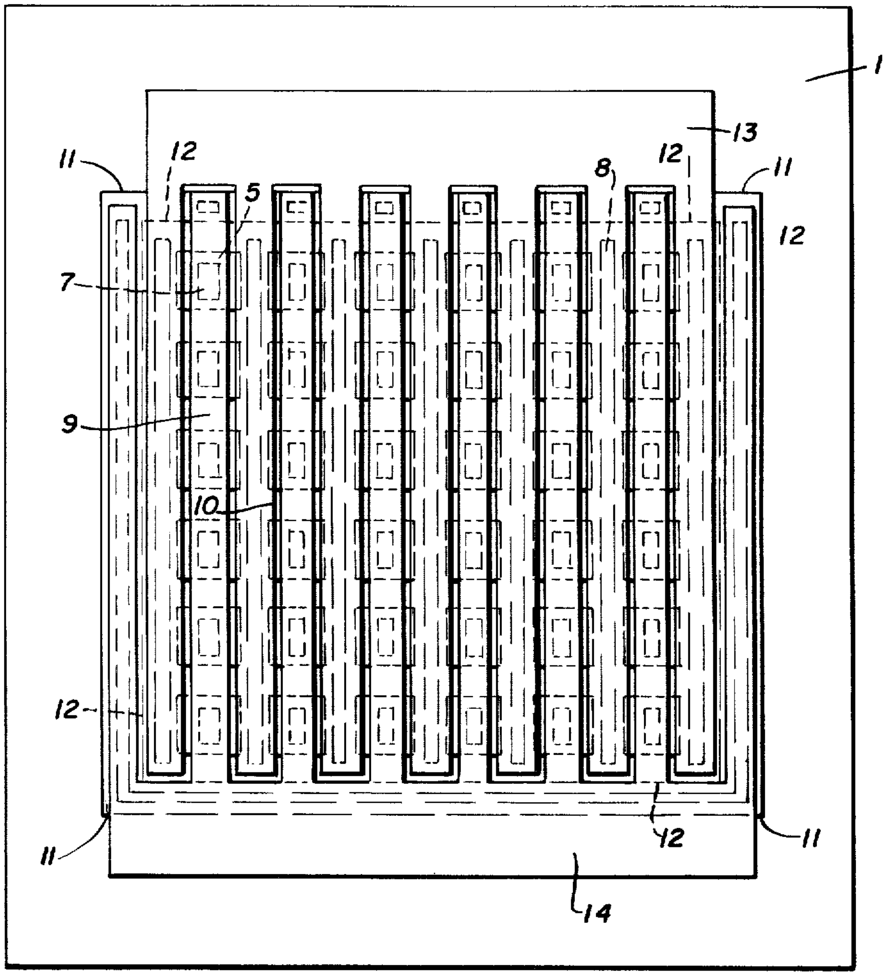
FIG. 4 is a plan view of a finished planar transistor fabricated in accordance with the principles of the present invention.

Referring now to FIG. 4, the finished planar transistor is shown in plan view. The line 11 indicates the outer limits of the base region arranged on the collector body 1. The outer limits of the emitter region 3 are indicated by the dashed lines 12.

As mentioned above, the openings 7 in the oxide layer 6 serve the purpose of contacting the portions 5 of the base zone which extends to the surface of the transistor through the perforations in the emitter zone. In order to contact the emitter zone, the strip-shaped openings 8 are provided in the oxide layer 6.

Electrical contact to the emitter zone 3 is made by the metal conductors 10 which have their end portions connected together by means of the metalized cross-connector 13. This arrangement provides a finger-like or comb structure for the emitter connector. Although the metal conductors 10 actually make physical contact only with a portion of the emitter surface, for all practical purposes the entire emitter surface is contacted. This is true since the portions not actually physically contacted by the metal conductor 10 make electrical contact by means of their low resistivity.

The contact to the base region is also provided by a finger-like or comb structure. This is accomplished by a metal conductor 9 which cooperates with the base region 5 through the openings 7 in the oxide layer. It can be seen that the metal conductors 9 have their end portions commonly connected to a connector 14.

In order to fabricate the preferred illustrated embodiment of the planar transistor incorporating the principles of the present invention, the base zone adjacent the collector body is arranged on the collector body in accordance with known planar techniques. In order to form the perforated emitter region, an oxide layer is arranged on the base region. The oxide layer is formed with a raster or grid-shaped emitter diffusion mask. The emitter impurities are then diffused into the base region through the openings in the oxide layer.

The comb-like connecting structures which mesh with each other as shown in FIG. 4 can be formed in a conventional manner by vacuum deposition, photo resist and etching techniques.

It can be seen that the planar transistor fabricated in accordance with the principles of the present invention has several advantages. First, it has a high ratio between the circumference of the emitter and the surface of the emitter. This is accomplished by the perforations in the emitter region that have been filled by portions of the base region; secondly, the electrical connections can be easily made both to the emitter region and to the base region. That is, low ohmic connections can be made on the surface of the transistor both to the emitter and to that portion of the base region which extends through the perforations in the emitter region.

Figure 5:
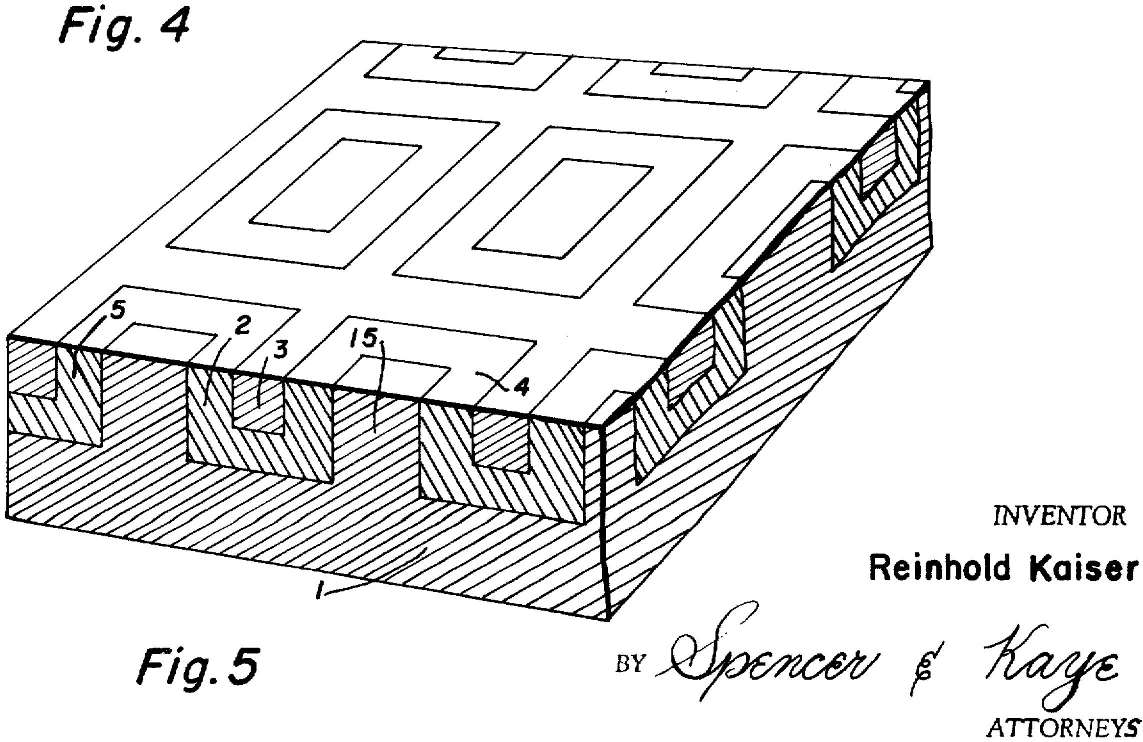
FIG. 5 is a perspective view showing schematically a transistor at which the perforations of the emitter region in accordance with an embodiment of the present invention are not only filled by portions of the base region but also by portions of the collector region.

In accordance with a further embodiment of the present invention, portions of the collector region as well as portions of the base region can also extend through and into the perforations in the emitter region. This embodiment which results in an improved charge carrier transport in the hole zone of the emitter region is shown in FIG. 5. It can be seen that the perforations 4 of the emitter zone 3 are filled not only by portions 5 of the base region 2 but also by portions 15 of the collector region 1. It can further be seen that both the portions 5 of the base region 2 and the portions 15 of the collector region 1 extend to the semiconductor slab surface of the transistor.

It will be understood that the above description of the present invention is susceptible to various modifications, changes, and adaptations, and the same are intended to be comprehended within the meaning and range of equivalents of the appended claims.

I claim:

1. A planar transistor comprising a semiconductor base region, a semiconductor collector region, and a semiconductor emitter region on a semiconductor slab, said emitter region being a single electrical unit and perforated in a sieve-like structure with a plurality of openings therein, semiconductor portions of said base region extending into the openings of said emitter region, said portions of the base region extending to a slab surface common with said emitter region.

2. A planar transistor as defined in claim 1, further comprising an electrical connecting means for contacting said semiconductor portions of the base region.

3. A transistor as defined in claim 2 wherein said electrical connecting means has a finger-like structure.

4. A transistor as defined in claim 1 wherein electrical contact to the emitter zone is made by an emitter contact having a finger-like structure.

5. A transistor as defined in claim 1 wherein parts of the collector region also extend into the perforations in the emitter region.

6. A planar transistor comprising a semiconductor base region, a semiconductor collector region, and a semiconductor emitter region on a semiconductor slab, said emitter region being perforated in a sieve-like structure, semiconductor portions of said base region extending into the perforations of said emitter region, semiconductor portions of said collector region extending into said semiconductor portions of the base region, said portions of the collector and base regions extending to a slab surface common with said emitter region.

7. A planar transistor as defined in claim 6, further comprising an electrical connecting means for contacting said semiconductor portions of the base region.

8. A semiconductor device comprising a semiconductor substrate of a first conductivity type having a principal surface; a first semiconductive region formed in the principal surface of said substrate and having a second conductivity type opposite to the first conductivity type; a second semiconductive region of the first conductivity type formed in said first semiconductive region like a lattice dividing the principal surface of said first semiconductive region into a plurality of independent portions and surrounding each of them, the second region having a depth smaller than that of the first region, the periphery of the lattice being surrounded by said first semiconductive region; a first conductive layer connected with said second semiconductive region on the principal surface; and a second conductive layer connected with said first semiconductive region on the principal surface.

9. A semiconductor device according to claim 8, wherein said semiconductor substrate forms a collector, said first semi-conductive region forms a base and said second semiconductive region forms an emitter.

10. A semiconductor device according to claim 8, wherein said second conductive layer is connected to all of said independent portions of said first semiconductive regions.

* * * * *